F. O. BROWN.
ELECTRICALLY HEATED TONGS.
APPLICATION FILED OCT. 24, 1921.
1,422,826. Patented July 18, 1922.
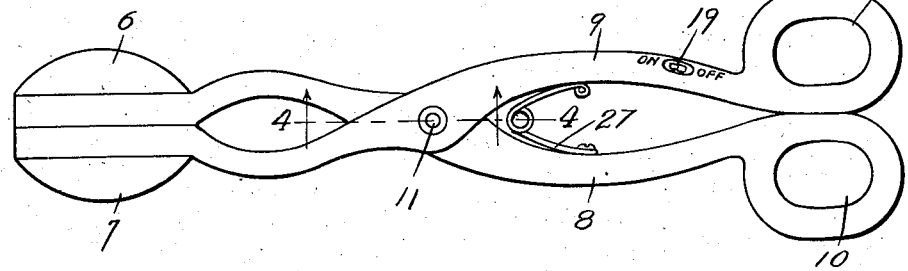
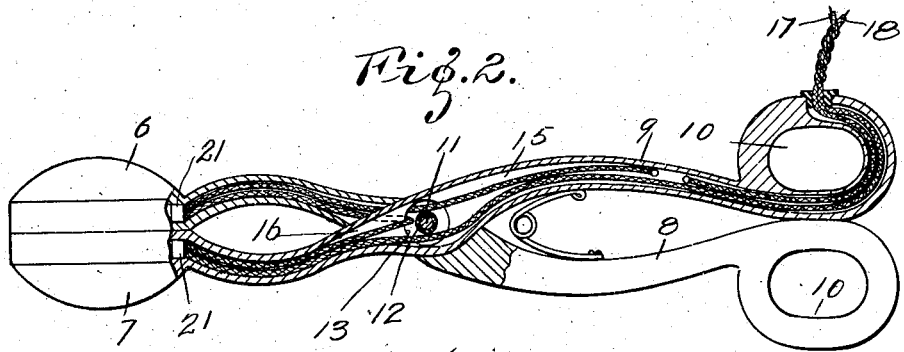
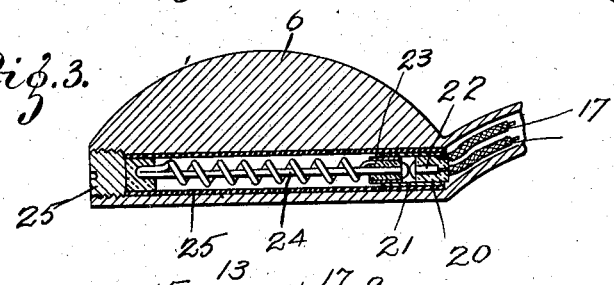
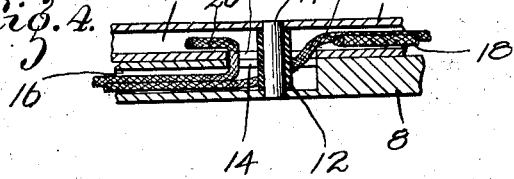
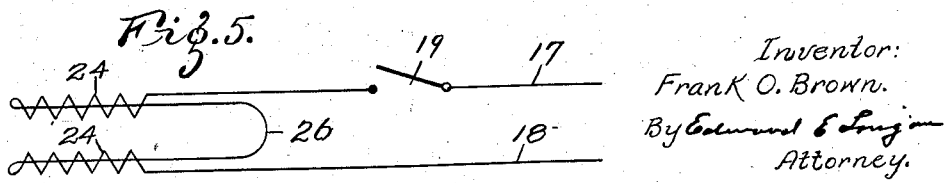
Inventor:
Frank O. Brown.
By Edmund E. Longin
Attorney.

UNITED STATES PATENT OFFICE.

FRANK O. BROWN, OF ST. LOUIS, MISSOURI.

ELECTRICALLY-HEATED TONGS.

1,422,826.

Specification of Letters Patent.  Patented July 18, 1922.

Application filed October 24, 1921. Serial No. 509,787.

*To all whom it may concern:*

Be it known that I, FRANK O. BROWN, a citizen of the United States, and resident of the city of St. Louis and State of Missouri, have invented certain new and useful Improvements in Electrically-Heated Tongs, of which the following is a specification containing a full, clear, and exact description, reference being had to the accompanying drawings, forming a part hereof.

My invention relates to improvements in electrically heated tongs, and has for its primary object a pair of tongs, the jaws of which are electrically heated.

A further object is to construct a pair of tongs which are electrically heated and in which the heating units can be readily removed for replacement or repair.

In the drawings,

Fig. 1 is a side elevation of my device, showing the tongs in closed position.

Fig. 2 a similar view with parts broken away and in section.

Fig. 3 an enlarged view of one of the jaws, showing the method of inserting the heating unit therein.

Fig. 4 an enlarged fragmental section taken on the line 4—4 of Fig. 1.

Fig. 5 a diagrammatic view, showing the wiring connections for the heating units.

In the construction of my device I employ a pair of jaws 6 and 7. These jaws are secured to handles 8 and 9. The handle 9 is hollow throughout the greater portion of its length, (see Fig. 2,) while the handle 8 is only hollow at its forward portion. The handles 8 and 9 are provided with loops 10 to permit the insertion of the fingers for manipulating the jaws 6 and 7. The handles 8 and 9 are pivotally connected together by means of a rivet 11, which rivet is surrounded by a sleeve of insulating material 12. The contacting faces of the handles 8 and 9 are provided with openings 13 and 14 which open into the channels 15 and 16. Formed in the handles 8 and 9 and in the openings or channels 15 and 16 are located electrical conductors 17 and 18. The electrical conductor 17 is interrupted to permit the insertion of a switch 19, by means of which the current can be turned on and off. Located in the adjacent forward end of the passage ways 16 and 15 is a plug comprising an insulating body 20 which is surrounded by a metallic sleeve 21 and in the center of the plug 20 is located a contact point or butt 22. The sleeve 21 extends forward so as to receive one end 23 of the heating unit 24. This heating unit is adapted to be placed within the recess or opening 25 formed in the jaws 6 and 7, and retain any position by means of the screw-threaded plug 25. It will be noted from Figs. 2 and 5, that the wire 17 extends into one of the jaws while the wire 18 extends into the other jaw, and in order to complete the circuit, a wire 26 is employed. This extends from the jaw 7 through the passage 16, then through the openings 13 and 14, and forward again in the passage 15 where it is connected to the plug 20 in the opposite jaw. This connection is clearly brought out in Fig. 5. If found desirable I may interpose a spring 27 between the arms 8 and 9, so that the tongs will be held open, or in other words, the jaws forced apart. This however is not essential, as the tongs may be opened and closed by the operation of the fingers. My device while preferably used for hair tongs can also be used as brazing tongs, or for any other purpose where it is desired to hold material between two heated jaws and subject them to a pressure.

It will be observed that the jaws have flat smooth contacting faces and the back portion oval; and further, that the forward edges of the jaws are flat. The flat contacting faces are especially designed to press the hair and remove the kinks from the same and straighten them out; and the outside oval faces are especially designed for curling the hair, and the front straight edges permit the jaws to come down close to the scalp for straightening short hair.

Having fully described my invention, what I claim is:

1. An electrically heated tong comprising a pair of hollow jaws, hollow handles formed integral with said jaws, a heating unit located in each of said jaws, electric conductors located in the hollow handles and connected to the heating units, said conductors extending through and out of one of said handles, an electric switch located in one of said handles for interrupting the electric current through said conductors, and means for removing said heating units.

2. An electrically heated tong comprising a pair of jaws having integrally formed hollow handles, said jaws having flat contacting faces and convex faces formed opposite said flat faces, a heating unit located in each jaw, electric conductors extending through said handles, a switch located in one of said handles for making and breaking the electric circuit through said conductors, and means for permitting the removal of said heating units.

3. An electrically heated tong comprising a pair of hollow handles pivotally secured together, a jaw secured to one end of each of said handles, an electric heating unit located in each jaw, electric conductors extending through said handles for relating the heating units to a suitable source of supply, a switch located in one of said handles for making and breaking the electric current passing therethrough, a spring for normally holding said jaws apart, and removable means located in each jaw for permitting the removal of the heating unit, without disconnecting the electric conductors.

4. An electrically heated tong comprising a pair of jaws having flat contacting faces and convex faces opposite the flat faces, said flat faces and convex faces being joined by a vertical face, an electric heating unit located in each jaw, a pair of handles pivotally connected together formed integral with said jaws, electric conductors secured to said heating units and located in said handles, a single switch located in one of said handles for making and breaking the circuit passing through the heating units, and means for permitting the replacement of the heating units without disconnecting the conductors.

In testimony whereof, I have signed my name to this specification.

FRANK O. BROWN.